Sept. 15, 1953 N. C. BYE 2,652,076
CUTTING SAW CHAIN
Filed March 10, 1950 2 Sheets-Sheet 1
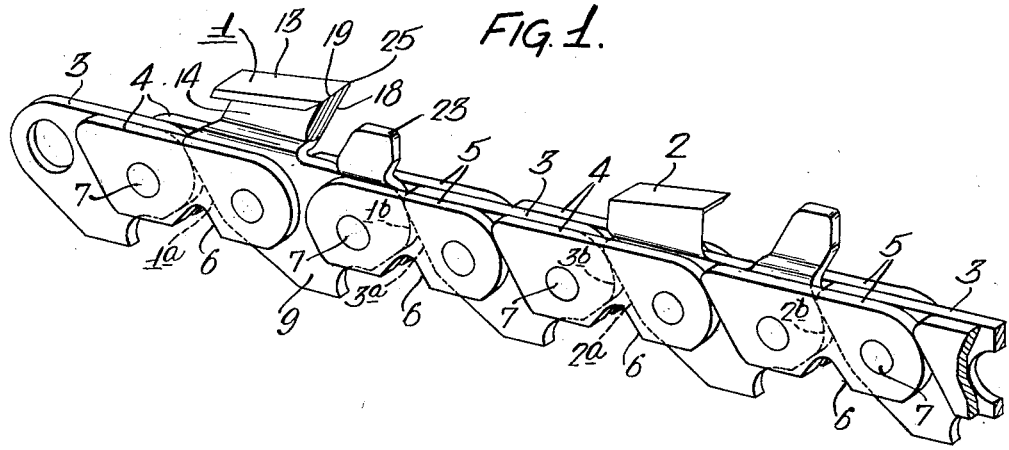
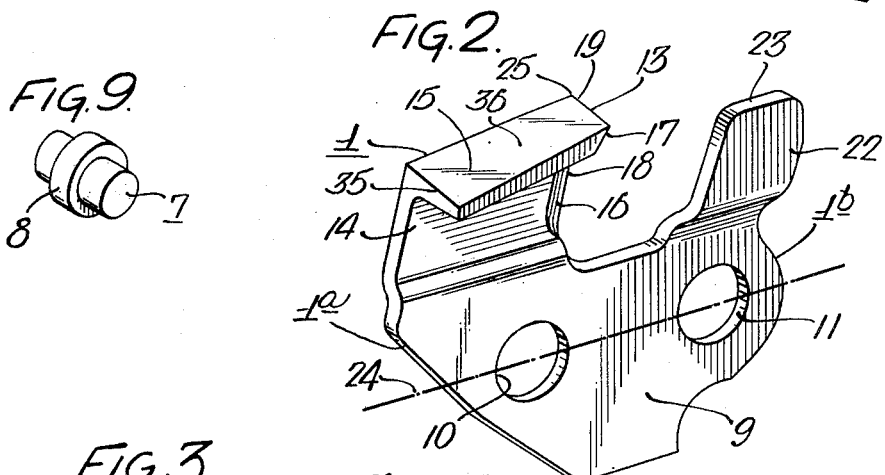
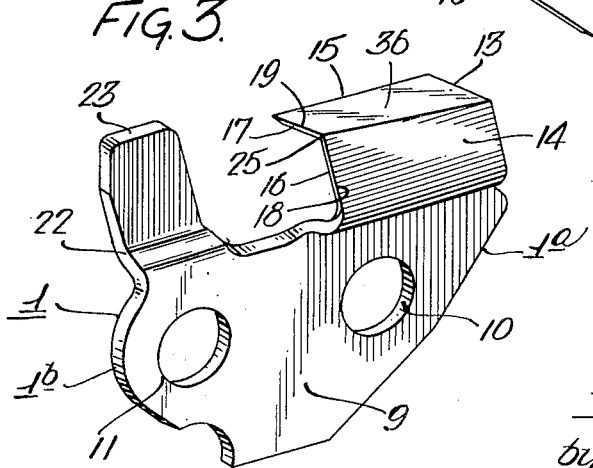
Inventor:
Norman C. Bye
by his Attorneys
Howson & Howson

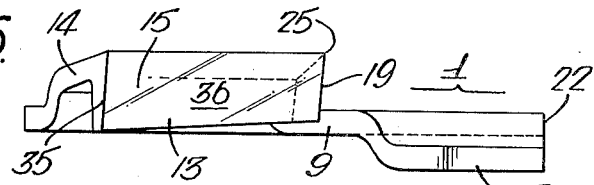
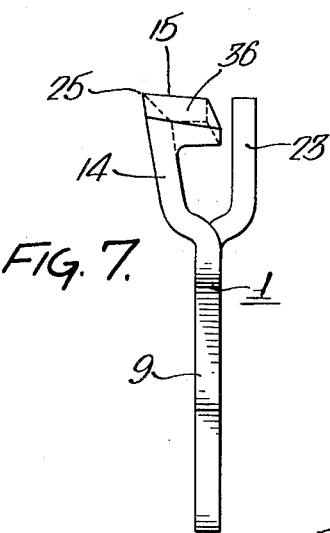
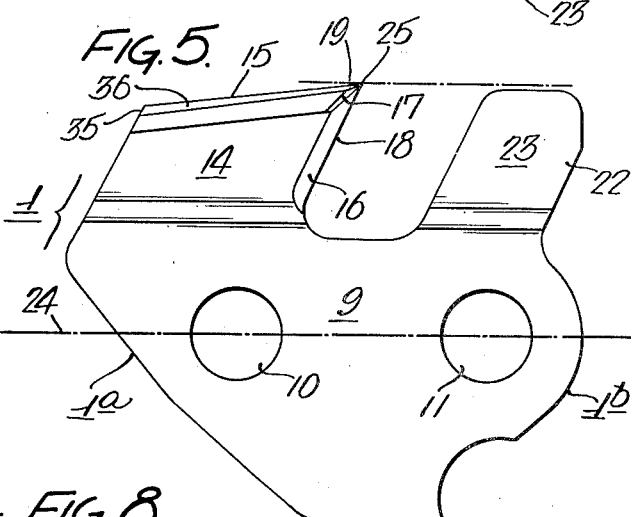
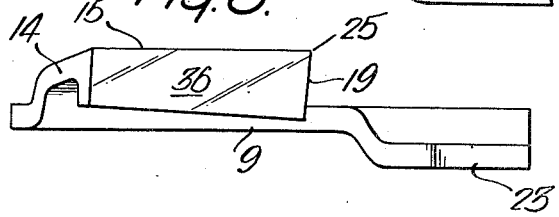
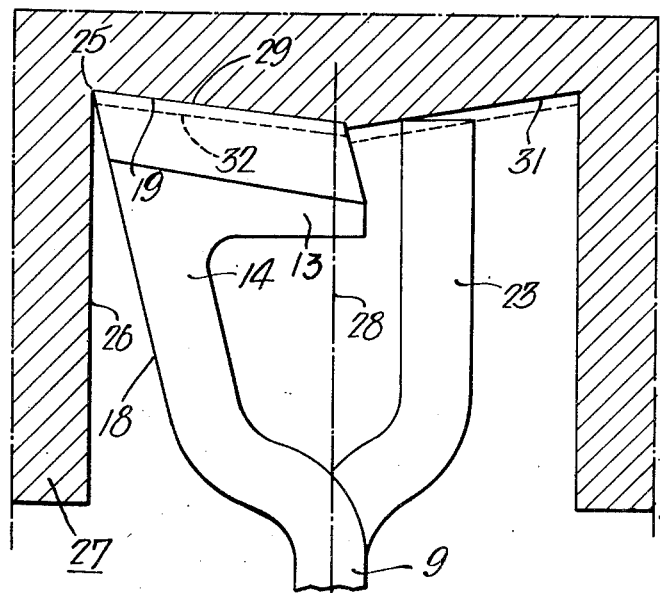

Patented Sept. 15, 1953

2,652,076

UNITED STATES PATENT OFFICE 2,652,076

CUTTING SAW CHAIN

Norman C. Bye, Wynmoore, Pa., assignor to Henry Disston and Sons, Inc., Philadelphia, Pa., a corporation of Pennsylvania Application March 10, 1950, Serial No. 148,787

9 Claims. (Cl. 143—135)

This invention relates to cutting chains of the chain saw type, and a principal object of the invention is to provide a cutting chain of generally improved functional characteristics.

Another object of the invention is to provide a cutting link of novel form that will materially improve the operating characteristics of the cutting chain of which it forms a part.

More specifically, an object of the invention is to provide a cutting chain which, by reason of inclusion therein of the novel form of cutting link hereinafter described, will exhibit an improved operating efficiency and a relatively great degree of freedom from roughness and vibration as compared to the cutting chains of prior art.

Another object of the invention is to provide a cutting chain having more precise means for gauging the depth of cut of the individual cutting teeth.

Still another object of the invention is to provide a cutting tooth of novel form capable of performing the functions both of scoring and routing.

Still another object is to provide a cutting chain wherein the width of the kerf may be regulated within small limits by minor variations in the form of the cutting elements.

The invention resides further in certain novel structural features hereinafter described and illustrated in the attached drawings, wherein:

Fig. 1 is a view in perspective of a section of a cutting chain made in accordance with the invention;

Figs. 2 and 3 are enlarged views in perspective showing the opposite sides of one of the cutting links;

Fig. 4 is a fragmentary sectional view on an enlarged scale showing the cutting tooth and depth gauge finger in operative positions in the work;

Fig. 5 is an enlarged side elevational view of the link;

Fig. 6 is a top plan view of the link;

Fig. 7 is a rear elevational view of the link;

Fig. 8 is a top plan view of a modified form of cutting link, and

Fig. 9 is a view in perspective of one of the link-connecting pins.

With reference to the drawings, the chain illustrated in Fig. 1 comprises alternately arranged cutting links 1 and 2, spacer links 3 interposed between the adjoining pairs of cutting links, and pairs of connecting links 4, 4 and 5, 5 which connect the spacer links to the cutting links as illustrated. In the present instance the connecting links of the respective pairs are recessed at 6, in accordance with the principle defined in United States Patent No. 2,485,962, dated October 25, 1949, for operative engagement with the teeth of a driving sprocket. The links are pivotally connected by pins 7 of the form shown in Fig. 9, the ends of the pins being riveted in the respective connecting links, and the relatively large central portion 8 of the pins fitting the pin apertures of the cutting and spacer links and forming pivot bearings for the latter, the relatively large diameter of the portions 8 affording desirably extended bearing surfaces.

Preferably the trailing ends of the said cutting and spacer links are extended and shaped as illustrated so as to present inclined edge surfaces 1a, 2a and 3a respectively, for engagement with the rounded leading edges 1b, 2b and 3b of the respectively adjoining cutting and spacer links, it being noted that the said rounded leading edge in each case defines a circular arc concentric with the proximate pin aperture of the same link. The ends of the connecting links, with an exception hereinafter noted, are similarly formed. When the chain is in a straight line position as shown in Fig. 1, the said inclined surfaces at the rear ends of the link will contact the rounded surfaces at the forward ends of the respective immediately following links and will act collectively to prevent flexure of the chain from this position except in the one direction required for tracking of the chain around the actuating sprocket.

The cutting links 1 and 2 are identical as to principle of design and operation but differ from each other in that the active elements are contraposed so that the links in effect constitute right and left hand cutters. In the chain assembly these right and left hand links alternate with each other longitudinally of the chain. Since the links are identical except for the reversal of their functional elements, one only will be described in detail.

With reference to Figs. 2 to 7, inclusive, of the drawings, the cutting link 1 therein illustrated consists of a flat body portion 9 which in assembly occupies the medium plane of the cutting chain, that is, the plane in which the chain operates and with respect to which the elements of the chain are usually symmetrically disposed. In the present instance, the chain is of the type which is adapted to travel in a slot in the edge of a suitable guide rail, and the body portion 9 of the cutting link, as well as the spacer links 3, are formed for engagement in said slot.

The body portion 9 of the link 1 also includes, at opposite ends thereof respectively, the circular apertures 10 and 11 which receive the pins 7.

The link 1 comprises an approximately L-shaped cutting tooth 13 the shank 14 of which is joined to and offset laterally to one side of the body portion 9 of the link. The other leg 15 of the tooth extends transversely from the outer edge of the shank 14 toward and preferably slightly past the median plane of the body portion 9, said plane, as set forth above, also constituting the median plane of the chain. The leading edges of the portions 14 and 15 of the tooth are beveled on the inner sides, as indicated at 16 and 17, to form cutting edges 18 and 19. The transverse leg 15 of the tooth thus constitutes a chisel portion adapted to operate on the bottom of the kerf as hereinafter described.

As best shown in Fig. 4, the shank 14 diverges angularly from the median plane toward its outer end and the edge 18 is similarly inclined to said plane so that the outer end of this edge is relatively remote to the median plane and, in fact, defines the outer side limit of the chain. The limit of the opposite side is similarly defined by the corresponding points of the cutting teeth of the links on that side of the median plane. Obviously the positions of these points with respect to the said plane will determine the width of the kerf cut by the chain.

As shown also in Figs. 4 and 5, the chisel portion 15 of the cutting tooth slants inwardly from its juncture with the shank 14 and backwardly toward the body 9 of the links and the cutting edge 19 is similarly inclined, so that the outer end of the edge 18, which is also the point of intersection of the edges 18 and 19, is also the point of the cutting edge furthest removed from the pitch line of the chain hereinafter defined. It will be noted therefor that in operation the chisel edge 19 will traverse the bottom of the cut within an area extending in the present instance from the median plane of the kerf to the proximate side thereof; and that the cutting links at the opposite side of the chain will operate correspondingly on the bottom area at the other side of said plane.

Toward the leading end 22, and in advance of the cutting tooth 13, the link carries a gauge element 23, which, as best shown in Fig. 4, takes the form of a finger offset in parallel relation to the body portion 9 of the link and to the opposite side of the median plane from the said cutting tooth. By reference to Figs. 4 and 5, it will be noted that the major height of the element 23, as measured from and on a line normal to the pitch line 24 which intersects the centers of the apertures 10 and 11, is slightly less than the major height of the cutting tooth, which as previously described lies at the juncture point 25 of the cutting edges 18 and 19. It will be noted also by reference to Fig. 1 that the trailing end of each connecting link which is attached to the leading end of a cutting link on the side toward which the gauge finger is offset, lacks the previously described angular extension which is characteristic of the other connecting links and is rounded after the manner of the leading edges so as to avoid interference between that connecting link and the finger when relative angular movement between the links occurs.

The location of the gauge finger 23 at the opposite side of the median plane from the side to which the shank 14 of the cutting tooth 13 is offset has an important function. This may be more readily understood by reference to Fig. 4 which shows the cutting tooth in operative position within a kerf 26 cut by the chain in a work piece 27. It will be apparent that in the cutting operation the bottom of the kerf will be formed in effect by alternate cuts at opposite sides of the median plane produced by the right and left hand cutter elements respectively. In Fig. 4 the tooth 13 is shown cutting the bottom of the kerf on the line 29 at the one side of the median plane 28. The line 31 indicates the cut of the immediately preceding opposite cutting tooth. This surface 31 then forms the track for the extremity of the gauge element 23, as illustrated. The cut formed by the preceding cutter element on the left hand side of the median plane 28, as viewed in Fig. 4, is indicated by the dotted line 32; and the immediately preceding cut at the opposite side of the median plane is indicated by the broken line 33. It will be apparent therefore that the interval between two successive cuts on opposite sides respectively of the median plane will be theoretically equal to one-half of the interval between successive cuts on one and the same side of said plane. By placing the gauge element 23 for the cutting tooth 13 at the opposite side of the median plane from the tooth and thereby utilizing the cut 31 as the datum surface upon which the gauge element rides, any departure from a normal cut by any one of the cutting teeth is promptly reflected in a corresponding variation in the cut of the immediately succeeding tooth on the opposite side of the median plane. If, on the other hand, the gauge element 23 were placed at the same side of the median plane as the cutting tooth 13, in accordance with the conventional practice, variations in the cuts of the individual teeth are cumulative on the side of the median plane on which the original departure from the normal occurs. The difference is that between a chain in which self-balance is inherent, and one in which balance is maintained only by extraneously applied restraints. One manifestation of this difference is found in the tendency of the applicant's chain to cut in a flat plane, whereas chains of the other type exhibit a tendency to diverge from such plane. Other advantages of the applicant's device reside in the substantial freedom of his chain from tendency to bind in the kerf, in the relatively low friction and wear characteristics, and in relatively low power consumption.

As previously noted, the cutting edge 19 inclines from the outer end thereof toward the median plane. By reason of this inclination and as previously set forth the highest effective point on the cutting edge of the tooth with respect to the pitch line 24 of the chain is the point 25. The cutting tooth thus functions in effect to score the fibres of the work piece along the lower outside edge of the kerf and to thereby more readily rout out the bottom of the cut by action of the chisel edge 19. Since, as shown in Fig. 6, the high point 25 slightly leads the rest of the cutting edge 19, the scoring action occurs in advance of the routing cut so that the work material in the bottom of the kerf is removed solely by chisel action of the cutter. In other words, the cutting teeth function first to score the outer bottom edges of the kerf and then to rout out the material between the scorings. They thereby assume in themselves the functions of the separate scoring and routing teeth conventionally used.

It is to be noted that the maximum thickness of the chips removed in this manner is controlled by the height of the depth gauge 23, and that the height of the gauge is somewhat less than the height of the point 25 but greater than the inner end of the cutting edge 19. Thus, the point 25 is higher than the inner end of the cutting edge by an amount greater than maximum thickness of the chips.

With reference again to Fig. 6, it is to be noted that the cutting edge 19 is provided in the present instance with a negative clearance at the inner end of said edge, this by reason of the fact that the width of the chisel portion 15 is smaller at the leading or cutting edge 19 than at the rear edge 35. It has been found that a negative clearance of this character creates a tendency for the tooth to tilt outwardly at its cutting edge about the pitch-line 24 toward the proximate side of the kerf and to thereby slightly increase the kerf width. This action is caused apparently by the fact that the bearing of the side of the cutting tooth in the area immediately adjoining the cutting edge against the shoulder formed between cuts 29 and 31 (see Figure 4) occurs under conditions of negative clearance and is also broader than the bearing of the tooth at the outer cutting point 25, where positive clearance prevails, against the side of the kerf. The tendency of the cutting tooth so to turn in the kerf is a function of the quantitative amount of the negative clearance and may therefore be accurately controlled to obtain a kerf sufficiently wider than the cutting chains to afford ample clearance for the return run of the latter which may be required to pass through the kerf.

It will be apparent that this tendency of the link to turn from its normal position may be avoided by provision of a positive clearance, as illustrated in Fig. 8.

A somewhat similar control of the kerf width may be effected by calculated grinding of the top surface 36 of the cutting tooth, i. e., the surface which in a cutting operation will confront the bottom of the kerf, to given angles relative to the median plane of the chain. By grinding this surface so that it slopes inwardly toward the median plane of the link and so that it also slopes away longitudinally from the front or cutting edge 19 toward the rear edge 35 and downwardly toward the pitch line, a chisel surface may be afforded wherein no two of the four corners thereof are at the same height relative to the aforesaid pitch line. If the chisel portion 15 is provided with negative or positive clearance, as described above and as illustrated in Figs. 6 and 8, the resulting form of the surface 36 will be a trapezium, whereas if no clearance is provided the said surface will take the form of a trapezoid. In either case the surface 36 will tend to ride against the bottom of the cut and will thus tend to throw the scoring point 25 of the tooth outwarly from the median plane of travel and to draw the link a little toward the side within the limits of looseness of the pins which connect the links. The result of this outward toeing of the scoring point and of the entire cutting edge of the link is to widen the kerf beyond the normal width of the chain at rest. This controlled "wildness" of the chain has a desirable effect, as set forth above, in that since the chain is operating upon a guide rail as an endless band, the return run of the chain at the back of the rail must, when the cut becomes deep enough, pass into and through the kerf. This upper or return portion of the chain is not participating in the cutting operation and the chisel surfaces 36 are not in contact with the work, so that the return run of the chain retains substantially its normal width. Since the kerf, as described above, is somewhat greater in width than the chain, the return run is afforded a slight clearance and is thereby permitted to enter the cut without tendency to bind. A significant power saving results, and the entire chain saw is easier to handle and to manipulate not only in the cutting operation but also when it becomes necessary to lift the chain saw out of the cut.

I claim:

1. A cutting chain comprising cutter links and means for connecting said links in the chain assembly, said links each comprising a single shank and a chisel portion at the outer end of said shank having a transverse cutting edge, said links being divided into two groups in one of which the shanks and a major extent at least of the cutting edge of each of the chisel portions are disposed to one side of the median plane of the chain and in the other of which the shanks and at least a major extent of the said cutting edge of each of the chisel portions are disposed to the other side of the said median plane, the cutter links of one group being alternately interspersed longitudinally of the chain with the links of the other group to form cuts alternately at least in major part on either side of said median plane, and each of said links including a depth gauge finger offset to the opposite side of the said median plane from the shank portion of said link so as to travel in the cut of the chisel portion of an immediately preceding link of the other group.

2. A cutting chain according to claim 1 wherein the said cutting edges define the leading ends of the respective chisel portions, and wherein said chisel portions slope rearwardly from said cutting edges toward the pitch line of the chain and laterally toward the said median plane.

3. A cutting chain according to claim 2 wherein the chisel portions are of lesser transverse width at the leading than at the trailing ends thereof.

4. A cutting chain according to claim 1 wherein the said cutting edges define the leading ends of the respective chisel portion and wherein the said leading ends are of lesser transverse width than the trailing ends.

5. A cutting chain, according to claim 1, wherein the leading edges of the shank and the chisel portions are beveled to form cutting edges and wherein further, the points of intersection of the said cutting edges of the respective links are further removed from the said median plane than any other points of the links.

6. A cutter link for a cutting chain comprising a chisel portion extending longitudinally of the said chain and having a cutting edge extending transversely to the median plane of said chain, one end of said edge being further removed from the said median plane than any other point of said link, and the other end of said edge being in proximity to the said median plane, said cutting edge constituting the leading end of said chisel portion, and the said chisel portion increasing in transverse width rearwardly from the cutting edge.

7. A cutter link for a cutting chain comprising a chisel portion extending longitudinally of the said chain and having a cutting edge extending transversely to the median plane of said chain, one end of said edge being further removed from the said median plane than any other point of said link, and the other end of said edge being in proximity to the said median plane, and a depth gauge element offset laterally to the side of said median plane opposite to said chisel portion, said cutting edge constituting the leading end of said chisel portion, the said chisel portion increasing in transverse width rearwardly from the cutting edge.

8. A cutter link according to claim 7 wherein the cutting edge of said chisel portion is operative to travel on the bottom of the kerf formed in the work by the cutting action of said chain and wherein further the chisel portion is formed with an inclined surface confronting the bottom of said kerf, said inclination being at an angle to provide the greatest clearance between the kerf-bottom and the said surface at the intersection of the trailing end of said chisel portion with the edge which adjoins said median plane.

9. A cutting chain comprising cutter links and means for connecting said links in the chain assembly, said links each comprising a single chisel portion having a transverse cutting edge and being divided into two groups in one of which the cutting edges of the respective chisel portions are disposed at least in major part to one side only of the median plane of the chain and in the other of which the said cutting edges are disposed at least in major part to the other side only of the said median plane, the cutter links of one group being alternately interspersed longitudinally of the chain with the links of the other group to form cuts alternately at least in major part on the respective opposite sides of said median plane, and each of said links including a depth gauge finger offset to the opposite side of the said median plane from the said major extent of the cutting edge of the chisel portion of said link so as to travel in the cut of the chisel portion of an immediately preceding link of the other group.

NORMAN C. BYE.

References Cited in the file of this patent

UNITED STATES PATENTS

| Number | Name | Date |
|---|---|---|
| 2,326,854 | Hassler | Aug. 17, 1943 |
| 2,508,784 | Cox | May 23, 1950 |
| 2,515,550 | Ciba | July 18, 1950 |